(12) United States Patent
Alarawi et al.

(10) Patent No.: US 12,128,382 B1
(45) Date of Patent: Oct. 29, 2024

(54) CELLULOUS NANOFIBER AEROGELS-BASED BIO UNIT FOR SEQUESTERING FLOW BACK CO2 AFTER HYDRAULIC FRACTURING OPERATIONS

(71) Applicant: SAUDI ARABIAN OIL COMPANY, Dhahran (SA)

(72) Inventors: Abeer Ateeq Alarawi, Khobar (SA); Sarah Yacob Alaskar, Dhahran (SA); Murtadha J. AlTammar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/647,271

(22) Filed: Apr. 26, 2024

(51) Int. Cl.
*B01D 53/81* (2006.01)
*B01D 53/22* (2006.01)
(Continued)

(52) U.S. Cl.
CPC .......... *B01J 20/267* (2013.01); *B01D 53/226* (2013.01); *B01D 53/229* (2013.01); *B01D 53/62* (2013.01);
(Continued)

(58) Field of Classification Search
None
See application file for complete search history.

(56) References Cited

U.S. PATENT DOCUMENTS 10,005,023 B2   6/2018   Burgers et al.
10,543,476 B2 *  1/2020  Li ...................... B01J 20/28047
(Continued)

FOREIGN PATENT DOCUMENTS

AU   2019240691 A1   10/2019
CN   114405421 A     4/2022

OTHER PUBLICATIONS

Wei, J et al., "Lightweight, flexible, and multifunctional anisotropic nanocellulose-based aerogels for CO2 adsorption," Cellulose, No. 27, pp. 2695-2707, Jan. 3, 2020 (13 pages).
(Continued)

*Primary Examiner* — Daniel Berns
(74) *Attorney, Agent, or Firm* — Osha Bergman Watanabe & Burton LLP

(57) ABSTRACT

Devices, methods, and systems for carbon dioxide ($CO_2$) sequestration using a cellulose nanofiber (CNF) aerogel, having a monolithic structure. The monolithic structure includes an aerogel matrix, a plurality of crosslinked CNFs, and a plurality of cellulose nanocrystal acetone (a-CNC) suspension particles, where the plurality of crosslinked CNFs and the plurality of a-CNC suspension particles are dispersed throughout the aerogel matrix. Systems and methods for $CO_2$ sequestration include locating a $CO_2$ producing process, separating, using a first membrane system, a feed stream into a mixed solid and liquid stream and a first gas stream and separating, using a second membrane system, the first gas stream to produce a second gas stream and a $CO_2$ rich stream. Systems and methods further include directing the $CO_2$ rich stream to a cellulose nanofiber (CNF) aerogel unit and adsorbing $CO_2$ from the $CO_2$ rich stream.

4 Claims, 5 Drawing Sheets

(51) Int. Cl.
*B01D 53/62* (2006.01)
*B01J 20/26* (2006.01)
*B01J 20/28* (2006.01)
*B01J 20/30* (2006.01)
*B01J 20/32* (2006.01)

(52) U.S. Cl.
CPC ........ *B01D 53/81* (2013.01); *B01J 20/28007* (2013.01); *B01J 20/28011* (2013.01); *B01J 20/28047* (2013.01); *B01J 20/28061* (2013.01); *B01J 20/28064* (2013.01); *B01J 20/3085* (2013.01); *B01J 20/3208* (2013.01); *B01J 20/3217* (2013.01); *B01J 20/3268* (2013.01); *B01D 2253/202* (2013.01); *B01D 2253/25* (2013.01); *B01D 2253/304* (2013.01); *B01D 2253/306* (2013.01); *B01D 2253/342* (2013.01); *B01D 2257/504* (2013.01)

(56) References Cited

U.S. PATENT DOCUMENTS

| | | |
|---|---|---|
| 11,725,091 B2 | 8/2023 | Zhang et al. |
| 2018/0043303 A1 | 2/2018 | Gebald et al. |

OTHER PUBLICATIONS

Yuksel, A., "Benefits of Alternative Fuels and Fuel-Flexibility," Cummins Newsroom: Education and Thought Leadership, pp. 1-5, dated Oct. 29, 2021 (5 pages).

Ozkan, M. et al., "The status and prospects of materials for carbon capture technologies," MRS Bulletin, vol. 47, pp. 390-394, Apr. 2022 (5 pages).

"Flowback (wastewater) from hydraulic fracturing," Ohio Department of Natural Resources Division of Oil and Gas Resources Management, retrieved on Apr. 25, 2024 (1 page).

Ho, N.A.D. et al., "A review on the emerging applications of cellulose, cellulose derivatives and nanocellulose in carbon capture," Environ Res., No. 197, Abstract, Jun. 2021 (1 page).

Sridhar, S. et al., "Membrane-based Gas Separation: Principle, Applications and Future Potential," ResearchGate, pp. 1-26, Jul. 2014 (26 pages).

Earthworks, "Hydraulic Fracturing 101"; <https://earthworks.org/issues/hydraulic-fracturing-101/>; Accessed Apr. 26, 2024 (13 pages).

\* cited by examiner

CELLULOUS NANOFIBER AEROGELS-BASED BIO UNIT FOR SEQUESTERING FLOW BACK CO2 AFTER HYDRAULIC FRACTURING OPERATIONS

BACKGROUND

Carbon capture and storage is a worldwide attractive route to attenuating carbon dioxide ($CO_2$) emissions and concentrations from the atmosphere. Since the industrial revolution, the concentrations of Green House Gases (GHG) in general, and $CO_2$ in particular, have increased, reaching a maximum peak of 409.8 ppm (parts per million) in 2019, higher than any other year. In comparison, prior to the industrial revolution the concentration of $CO_2$ fluctuated between 180 ppm to 280 ppm. This radical shift that struck the world inspired seeds of research opportunities to flourish and tackle solutions to reduce GHG and $CO_2$ concentrations.

There are several solutions that strive to control $CO_2$ concentration in the atmosphere. These solutions include, for example, trees restoration, finding alternative fuel sources, direct air capture (DAC), carbon mineralization, and practicing Carbon Capture Utilization and Sequestration (CCUS). In trees restoration $CO_2$ levels are reduced by naturally storing $CO_2$ in trees. Finding alternative fuel is another major solution to reducing $CO_2$ concentrations from the atmosphere. Alternative fuel sources could take on many forms including, for example, electrifying cars, electrifying ships, utilizing wind and solar energies, in addition to using sustainable biofuels. Although utilizing alternative fuels can work as a sustainable substitute to conventional energy sources that capitalizes on burning fossil, they still have several challenges associated with them, e.g., low shelf life, environmental compatibility challenges, and cannot be installed anywhere. Carbon mineralization involves reacting minerals with $CO_2$ to turn it from the gas phase to the solid phase hence removing it from the atmosphere permanently. Direct air capture (DAC) is the process of chemically scrubbing carbon dioxide from the ambient air and then sequestering it either underground or in long-lived products like concrete. Unlike CCUS, DAC removes excess carbon that has already been emitted into the atmosphere, instead of capturing it at the source. CCUS, on the other hand, is an industrial method that relies on collecting produced $CO_2$ (from sources like coal-fired power plants, or the like), and either reusing the produced $CO_2$ or storing it underground to prevent dissipation into the atmosphere.

The energy industry currently relies on several materials for absorbing and storing $CO_2$ such as activated carbon, zeolites, silica gels, carbon nanotubes, and amine supported sorbents. Zeolites, silica gels, activated carbons, and amine-supported sorbents are materials that operate either by physical adsorption (physisorption) or by chemical adsorption (chemisorption) mechanisms. Activated carbons, for example, exhibit the physisorption capture mechanism. This is a low-heat adsorption process that requires less energy, up to +40 kJ/mol, to desorb the $CO_2$. Unfortunately, due to the weak interactions involved, physisorbent materials tend to have low selectivity for $CO_2$. On the other hand, amine-grafted chemisorbents have a higher $CO_2$ capture capacity and selectivity but may react irreversibly with contaminant species in flue gas, such as $SO_2$, which lowers their $CO_2$ removal capacity. Like the amine solvents, chemisorbents may require high energy to desorb $CO_2$, up to 100 kJ/mol, and can be susceptible to chemical degradation, making the overall carbon capture process using chemisorbents expensive. Zeolites, and silica gels, have great potential for $CO_2$ storage, however they are limited by several disadvantages. The biggest disadvantage of zeolites stems from their high cost, complex structure, and the dependability of $CO_2$ capture capabilities on their pore size. Also, zeolites have a low selectivity for $CO_2$ in the presence of other gases such as $N_2$. Additionally, zeolites with low Si/Al ratios, have a disadvantage due to their strong affinity for water, and water competes with $CO_2$ for the adsorption sites making them moisture sensitive. Furthermore, zeolites display poor $CO_2$ adsorption capacity at very low pressures, hence, if operated at atmospheric pressure conditions it becomes difficult to achieve good $CO_2$ adsorption. As for silica gels, they have a low absorbance capacity for $CO_2$ if used by themselves and require high thermal regeneration temperature.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to devices for carbon dioxide ($CO_2$) sequestration, including a cellulose nanofiber (CNF) aerogel, having a monolithic structure. The monolithic structure includes an aerogel matrix, a plurality of crosslinked CNFs, and a plurality of cellulose nanocrystal acetone (a-CNC) suspension particles, where the plurality of crosslinked CNFs and the plurality of a-CNC suspension particles are dispersed throughout the aerogel matrix.

In another aspect, embodiments disclosed herein relate to methods for carbon dioxide ($CO_2$) sequestration, including locating a $CO_2$ producing process, where the $CO_2$ producing process produces a feed stream. The method also includes separating, using a first membrane system, the feed stream into a mixed solid and liquid stream and a first gas stream and separating, using a second membrane system, the first gas stream to produce a second gas stream and a $CO_2$ rich stream comprising $CO_2$. The method further includes directing the $CO_2$ rich stream to a cellulose nanofiber (CNF) aerogel unit, including a CNF aerogel, having a monolithic structure, where the monolithic structure includes an aerogel matrix, a plurality of crosslinked CNFs, and a plurality of cellulose nanocrystal acetone (a-CNC) suspension particles. The plurality of crosslinked CNFs and the plurality of a-CNC suspension particles are dispersed throughout the aerogel matrix. Finally, the method includes adsorbing, using the CNF aerogel unit, $CO_2$ from the $CO_2$ rich stream.

In yet another aspect, embodiments disclosed herein relate to systems for $CO_2$ sequestration, including a $CO_2$ producing process, where the $CO_2$ producing process produces a feed stream, a first membrane system, located downstream of the $CO_2$ producing process, where the first membrane system is configured to receive the feed stream and separate the feed stream into a mixed solid and liquid stream and a first gas stream. The system also includes a second membrane system, located downstream of the first membrane system, where the second membrane system is configured to receive the first gas stream and produce a second gas stream and a stream including $CO_2$. The system further includes a cellulose nanofiber (CNF) aerogel unit, located downstream of the second membrane system, including, a CNF aerogel, having a monolithic structure, wherein the monolithic structure includes an aerogel matrix, a plurality of crosslinked CNFs, and a plurality of cellulose nanocrystal acetone (a-CNC) suspension particles, where the plurality of crosslinked CNFs and the plurality of a-CNC suspension particles are dispersed throughout the aerogel matrix and where the CNF aerogel unit is configured to receive a stream including $CO_2$ and adsorb a quantity of $CO_2$ from the stream comprising $CO_2$.

Other aspects and advantages of the claimed subject matter will be apparent from the following description and the appended claims.

DETAILED DESCRIPTION $CO_2$ capture and storage are of particular interest in the oil and gas industry. One method for $CO_2$ capture is via adsorption. Adsorption is defined as a process where gas or liquid molecules are captured on the surface of an adsorbent material where they can enter the bulk of the material and create a strong interaction there. In other words, adsorption is a surface process that leads to the transfer of a molecule from a fluid bulk to a solid surface. Due to their sustainability and natural derivation, bio-mass derived materials are an attractive potential candidate for capturing $CO_2$ in oil and gas operations, for example, after hydraulic fracturing operations.

Embodiments disclosed herein relate to methods and compositions to sequester flow-back $CO_2$ during hydraulic fracturing operations using cellulose nanofiber (CNF) aerogels-based bio units. Embodiments disclosed herein also relate to systems for $CO_2$ sequestration using a CNF aerogel. Once a CNF aerogel unit is filled with $CO_2$ it may be recycled and converted into a value-added recycled product.

Cellulose is a complex polysaccharide which forms the principal component of plant cell walls. Cellulose is a linear homopolymer of d-glucose units linked by β (1-4)-glycosidic bonds, having a chemical formula of $(C_6H_{10}O_5)_{11}$, as shown below.

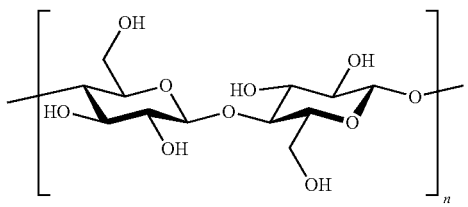

The performance and structural properties of CNF aerogels are largely dependent on the preparation method and concentration and type of cellulose included in the aerogel. Therefore, CNF aerogels are divided into three categories based on their raw materials: natural cellulose aerogels (cellulose aerogels, bacterial cellulose aerogels), regenerated cellulose aerogels, and cellulose derivate aerogels.

CNF aerogel may have specific surface area (e.g., 100-1000 $m^2/g$), porosity (e.g., 84.0-99.9%), and density (e.g., 0.0005-0.35 $g/cm^3$) values comparable to those of traditional silica aerogels and synthetic polymer aerogels. However, CNF aerogels have a higher compressive strength (e.g., 5.2 MPa-16.67 MPa) and better biodegradability. Therefore, CNF aerogels are a type of environmentally friendly and multi-functional new material that may be used in applications such as adsorption and oil/water separation, heat insulation, biomedical materials, metal nanoparticle/metal oxide carriers, the preparation of carbon aerogels, and many other areas.

System for $CO_2$ Sequestration

Figure 1A:
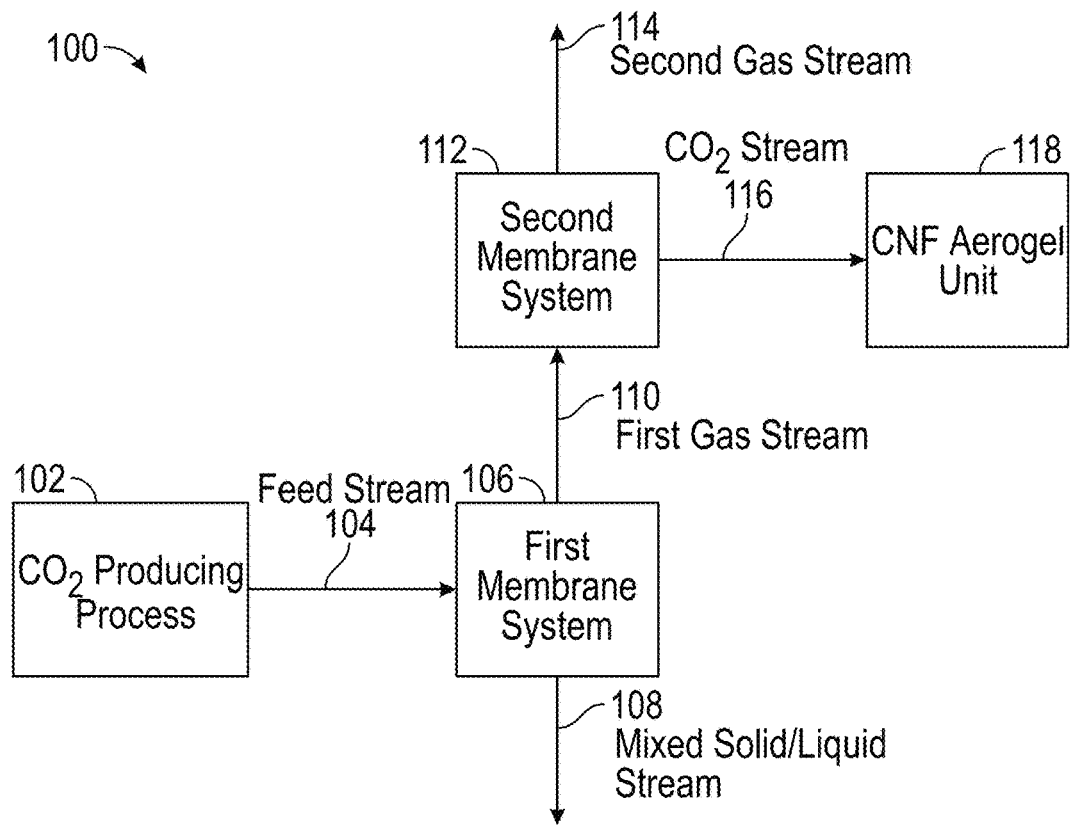
FIGS. 1A-C show systems according to one or more embodiments.

Systems for $CO_2$ sequestration using cellulose nanofiber (CNF) are disclosed herein. FIG. 1A shows an example of such systems, where the system 100 includes a $CO_2$ producing process 102, a first membrane system 106, a second membrane system 112, and a CNF aerogel unit 118.

The $CO_2$ producing process 102 of FIG. 1A produces a feed stream 104. The feed stream 104 composition may vary depending on the $CO_2$ producing process and may include solids, liquids, and gases, where one of the gases includes $CO_2$, and combinations therein.

The $CO_2$ producing process of one or more embodiments may be any process capable of producing a feed stream including $CO_2$. Examples of $CO_2$ producing processes include, but are not limited to, a hydraulic fracturing process, a central processing facility where a flow-back stream is connected via pipelines to such facility, and a gas-oil separation plant (GOSP).

Figure 1B:
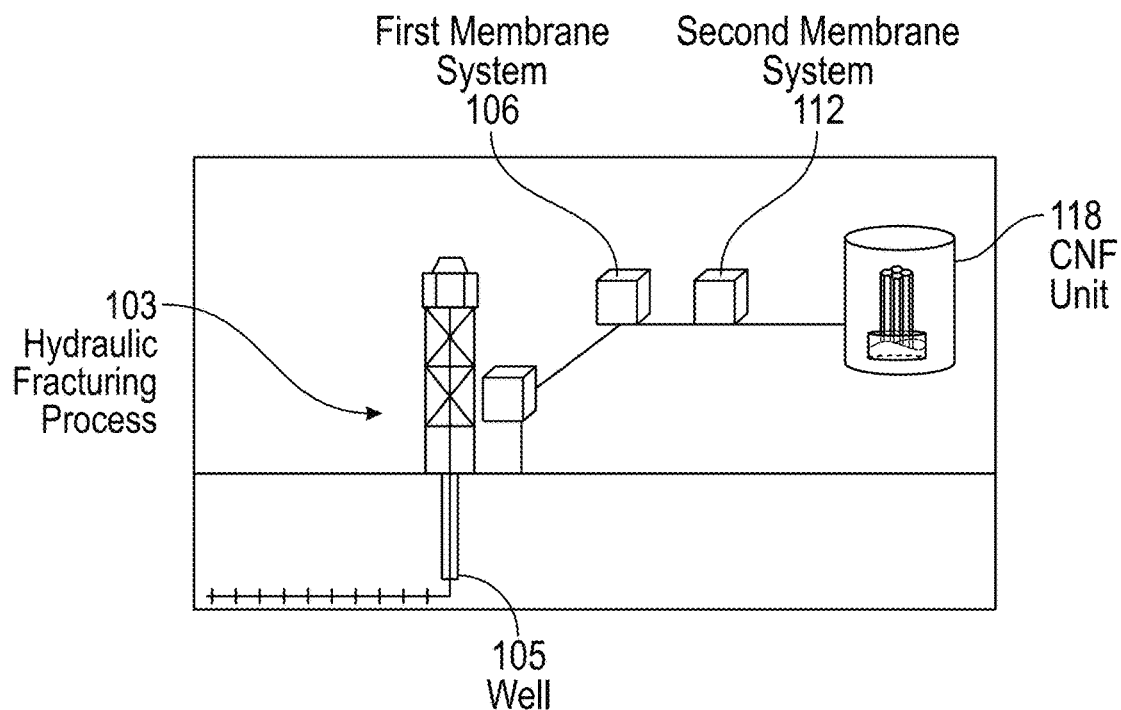

In some embodiments, such as the system shown in FIG. 1B, the $CO_2$ producing process 102 is a hydraulic fracturing process 103. Hydraulic fracturing is a process which takes place after drilling a well 105 and may involve injecting $CO_2$ into the well 105 as a driving force to mobilize hydraulic fracturing fluids to their desired location. In the hydraulic fracturing process 103, a mixture containing proppants, water, and chemical additives is pumped into a wellbore under pressure with the goal of fracturing a formation. After the hydraulic fracturing process 103 is complete, the majority of the water, chemical additives, and proppant used in the process remain underground. However, about 15% to 20% of those fluids may return to the surface, along with liquid hydrocarbons from downhole, through steel-cased wellbores, thus creating a "flow-back" stream including $CO_2$, which is typically collected in a surface pit. The hydraulic fracturing process 103 may therefore produce a feed stream containing a mixture of solids, liquids, and gases. The solids in the feed stream may include proppants and geological materials. The liquids in the feed stream may include water, liquid hydrocarbons, and chemical additives. The gases in the feed stream include $CO_2$, as well as other gases such as methane.

In some embodiments, the hydraulic fracturing process may be a $CO_2$-foam based fracturing treatment. In general, a foam based fracturing treatment includes injecting a foam material into a wellbore to reduce water use and to help improve ease of wastewater treatment. The foam material in the foam based fracturing treatment may be an immiscible mixture of liquid and gas phases. The gas may be selected from gases such as nitrogen gas and $CO_2$, for example. Use of $CO_2$ in a foam based fracturing composition, also referred to as a $CO_2$-foam based fracturing treatment, can contribute a significant amount of $CO_2$ to the feed stream 104 shown in FIG. 1A, when the feed stream 104 is produced from the hydraulic fracturing process. The amount of $CO_2$ that may be in the flow-back stream after a $CO_2$-foam based fracturing treatment may range from about 50-60% of total flowback gases.

The systems 100 shown in FIGS. 1A and 1B further include a first membrane system 106 located downstream of the $CO_2$ producing process 102. The first membrane system 106 is configured to receive the feed stream 104 produced from the $CO_2$ producing process 102 and separate the feed stream 104 into a mixed solid and liquid stream 108 and a first gas stream 110.

Membrane filtration is a pressure-driven separation process that employs a membrane for both mechanical and chemical sieving of particles and macromolecules. In one or more embodiments, the first membrane system may be any membrane capable of separating the feed stream into a mixed solid and liquid stream and a first gas stream. A membrane is a selective barrier separating ingredients from a feed stream through the membrane. The first membrane system of one or more embodiments operates based on a density difference between two or more solids, liquids, and/or gases. In the first membrane system, solids and liquids may precipitate out of the feed stream due to the higher density of solids and liquids compared to gases.

Non-limiting examples of methods for separating the feed stream into the mixed solid and liquid stream and the first gas stream using the first membrane system may include the following: Decanting (e.g., allowing solids in a mixture to settle and then pouring off the liquid), gravity filtration (e.g., allowing a liquid to fall through a filter by gravity and then discarding solids caught by the filter), suction filtration (e.g., similar to gravity filtration but using a vacuum to suction liquid), hot filtration (e.g., crystallization), pipette filtration, centrifugation, and the like. The first membrane system may also include, for example, porous inorganic membranes, palladium membranes, polymeric membranes, zeolites, and similar membrane systems that allow separation of Co2 from the gaseous stream.

The first membrane system of one or more embodiments may include porous membranes, non-porous membranes (also known as asymmetric membranes), or other membranes known in the art. Factors to consider for selecting a first membrane for the first membrane system may include the size of particles or molecules to be removed, operating transmembrane potential (TMP), mechanical strength, pore size, surface charge, and resilience to the cleaning chemicals that are inevitably required to keep the membrane clean.

The membrane in the first membrane system may be operated in a dead-end configuration, or a cross-flow configuration where the pressurized feed fluid/gas is recirculated at a high velocity across the face of the membrane. A fluid/gas that passes through the membrane may be referred to as permeate, whereas the liquids, solids, and solute that are rejected by the membrane may be referred to as either concentrate or reject. The feed may be recirculated at high velocity in order to impart a shearing action that helps mitigate the accumulation of solids on the membrane.

The mixed solid and liquid stream composition may vary depending on the feed stream, and the $CO_2$ producing process. The mixed solid and liquid stream may include solids, liquids, and combinations thereof, including proppants, geological materials, liquid hydrocarbons, and water, for example.

The first gas stream composition (separated from the mixed solid and liquid stream) may also vary depending on the feed stream, and the $CO_2$ producing process. The first gas stream may include one or more gases, where one of the gases includes $CO_2$.

The systems 100 shown in FIGS. 1A and 1B further include a second membrane system 112 located downstream of the first membrane system 106. The second membrane system 112 is configured to receive the first gas stream 110 produced from the first membrane system 106 and separate the first gas stream 110 into a second gas stream 114 and a $CO_2$ stream 116.

In one or more embodiments, the second membrane system may be any membrane capable of separating the first gas stream into a second gas stream and a $CO_2$ stream. The second membrane system of one or more embodiments operates based on a density difference between two or more gases. In the second membrane system, two or more gases may be separated by mass transfer through porous membranes which may rely on various types of separation mechanisms, e.g., viscous flow, Knudsen diffusion, surface diffusion, capillary condensation, molecular sieving, and solution-diffusion. The second membrane system of one or more embodiments may include porous membranes, such as porous membranes made with polymers such as polycarbonates, polyimides, polyamides, polyetherimides, and/or polysulfones, or other membranes known in the art.

In some embodiments, a second membrane may separate $CO_2$ from a second gas stream using rapid mass transfer and high selectivity towards a specific gas, where gas molecules may interact with the second membrane pore walls much more frequently than colliding with one another, thereby allowing lighter gas molecules to preferentially diffuse through pores of the second membrane. For example, a second membrane may filter $CO_2$ gas from the first gas stream using Knudsen diffusion, where the second membrane pore sizes are smaller than the mean free path of specific gas molecules in the second gas stream. In such embodiments, the second membrane may have a pore diameter in the range of 50-100 Å.

In some embodiments, a second membrane may be designed to filter $CO_2$ gas from a second gas stream using molecular sieving, which includes size exclusion and shape discrimination amongst various gas molecules by the membrane's micropores, e.g., having a size of <7 Å in diameter.

In some embodiments, gas permselectivity of a membrane can be enhanced by facilitated transport which involves reversible complexation and transport of permeant molecules across a membrane through utilization of a carrier species. The carrier reacts with a permeant molecule to form a labile complex. Within the membrane, the carrier shuttles the permeant across the membrane boundaries to a downstream side of the membrane, where the carrier-gas molecule complex breaks, allowing the gas to flow into the permeate stream. When a feed mixture contains only one species with which the carrier will react, e.g., $CO_2$, the transport of that particular species will be "facilitated" or carrier-mediated across the membrane. In such manner, a facilitated transport gas separation mechanism may also be used to separate a $CO_2$ gas stream from a second gas stream. Gas separation using facilitated transport may be utilized with "immobilized liquid" membranes, prepared by dissolving the carrier in an appropriate solvent to impregnate an electrically neutral but rigid microporous polymer matrix. Once formed, surface tension force serves to hold the carrier molecules inside the membrane.

The second gas stream composition may vary depending on the first gas stream composition. The second gas stream may include one or more gases, including methane, water, heavy hydrocarbon gases, hydrogen sulfide, and nitrogen, for example. Heavy hydrocarbon gases are defined herein as heterogenous mixtures of compounds consisting mainly of alkylated cyclic, resins and asphaltene. In one or more embodiments, depending on the source of the second gas stream, heavy hydrocarbons may form a significant proportion (e.g., at least 20 vol. %) of the hydrocarbons present in the second gas stream.

The $CO_2$ stream of one or more embodiments may contain primarily $CO_2$. In one or more embodiments, the $CO_2$ stream may include a $CO_2$ composition of from about 98.00 wt % to about 99.99 wt %, for example, the $CO_2$ composition may be in a range having a lower limit of from about 98 wt %, 98.5 wt %, and 99 wt % to an upper limit of about 99.25 wt %, 99.50 wt %, 99.75 wt %, and 99.99 wt %, where any lower limit may be paired with any upper limit.

Returning to FIG. 1A, the system 100 further includes a CNF aerogel unit 118 located downstream of the second membrane system 112. The CNF aerogel unit 118 is configured to receive the $CO_2$ stream 116 produced from the second membrane system 112 and adsorb a quantity of $CO_2$ from the $CO_2$ stream 116.

The CNF aerogel unit 118 of one or more embodiments includes a CNF aerogel and a container securing the CNF aerogel in the unit. The container portion of the CNF aerogel unit 118 of one or more embodiments may be any container known in the art capable of securing the CNF aerogel into the unit. For example, the container may be a frame, a tank, a drum, or the like. The CNF aerogel of one or more embodiments may have a composition and any of the properties as described in the following sections.

In one or more embodiments, the rate of $CO_2$ adsorbed by the CNF aerogel unit from the $CO_2$ stream is in a range of from about 0.50 to about 7.00 mmol $CO_2$/g, for example, the $CO_2$ composition may be in a range having a lower limit of from about 0.50, 1.00, and 1.50 mmol $CO_2$/g to an upper limit of from about 3.00, 5.00, and 7.00 mmol $CO_2$/g, where any lower limit may be paired with any upper limit.

Figure 1C:
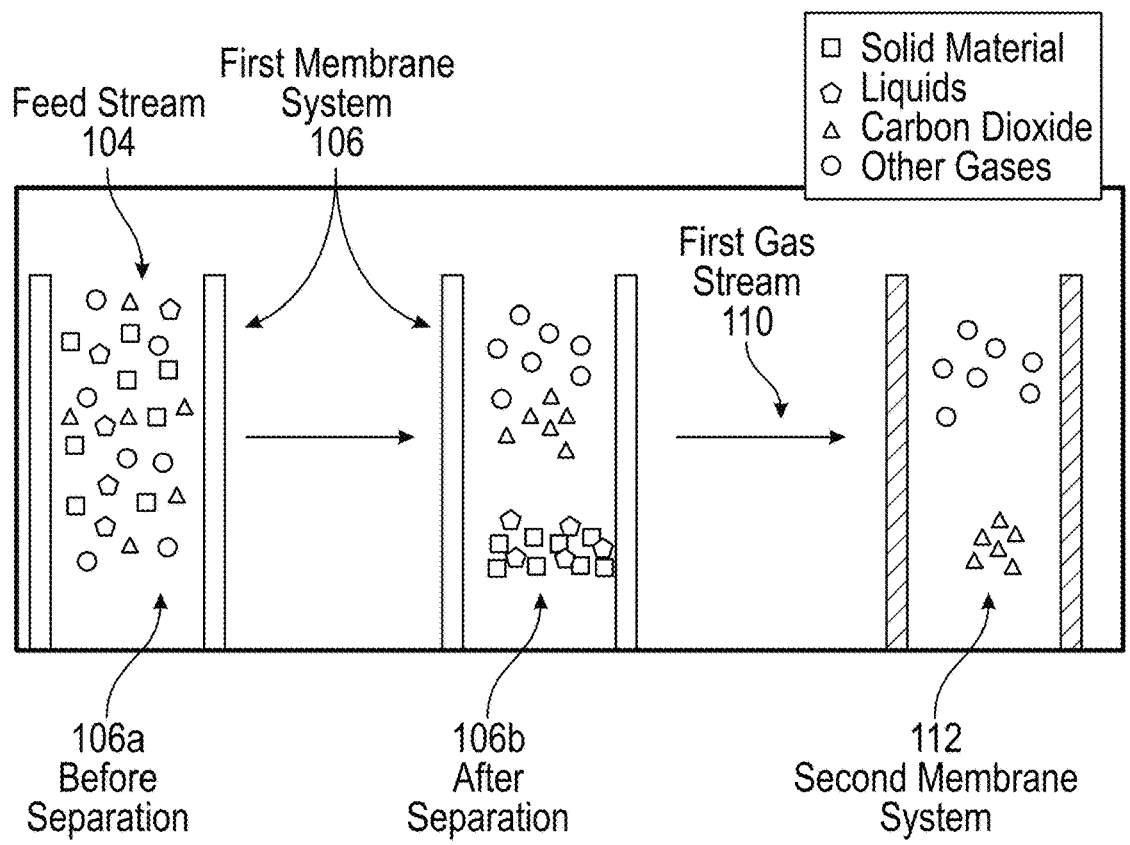

FIG. 1C shows an example of the dual membrane filtration sequence that may be used in the systems of FIGS. 1A and 1B. As shown in FIG. 1C, a feed stream 104 may be fed through a first membrane system 106. In the first membrane system 106, gases including $CO_2$ and $CH_4$ present in the first membrane system 106 before separation 106a may be separated from liquids and solid materials. In the first membrane system 106, solids and liquids are expected to precipitate out of the solution due to the density difference between them and the gases present. A depiction of the first membrane system 106 after separation is shown in 106b. The ejected stream of gases from the first membrane (the first gas stream 110) is then directed to a second membrane system 112, which may separate $CO_2$ gas from $CH_4$ gas based on their density difference. $CH_4$ has a molar mass of 16 g/mol and $CO_2$ has a molar mass of 44 g/mol, thus $CO_2$ is almost three times as heavy as the $CH_4$, thereby allowing the second membrane system 112 to separate the $CO_2$ gas from $CH_4$ based on their difference in density. Once the $CO_2$ gas is separated, it may then be moved to a CNF bio cell unit, where the $CO_2$ gas may be adsorbed and captured.

Cellulose Nanofiber (CNF) Aerogel

Embodiments herein also relate to devices for $CO_2$ sequestration, where the device for $CO_2$ sequestration may include a cellulose nanofiber (CNF) aerogel. The CNF aerogel of one or more embodiments includes a monolithic structure having an aerogel matrix formed of crosslinked CNFs, pores, and cellulose nanocrystal acetone (a-CNC) suspension particles dispersed throughout the aerogel matrix.

Figure 2:
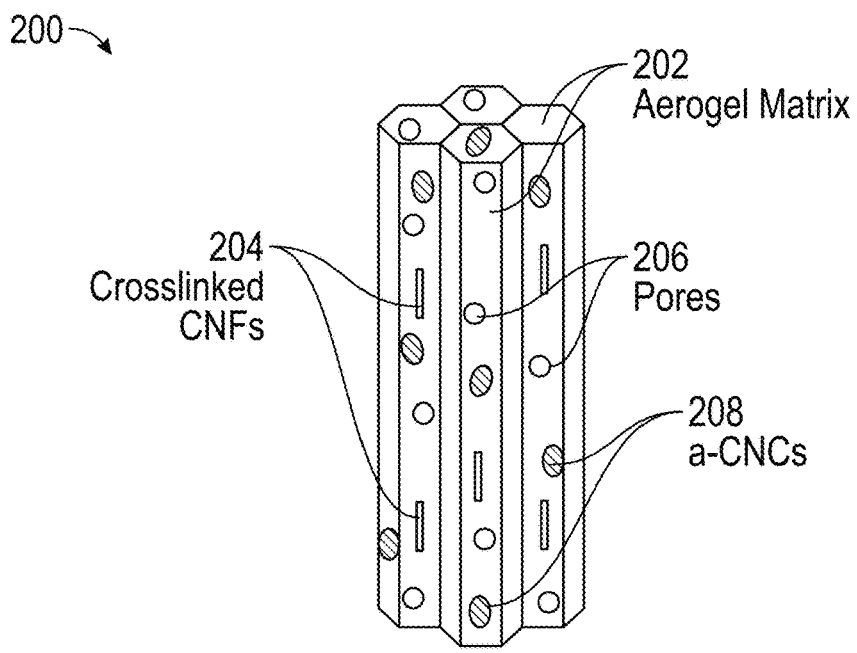
FIG. 2 is an illustration of a CNF aerogel according to one or more embodiments.

FIG. 2 is a representation of the CNF aerogel in accordance with one or more embodiments. The CNF aerogel 200 in FIG. 2 has a monolithic structure, as depicted by the repeating hexagonal prism shapes, which make up an aerogel matrix 202. A "monolithic structure" as described herein refers to a material structure which is made of multiple uniform blocks, consisting of parallel channels that can be extruded into different shapes and sizes.

An aerogel is defined as a light, highly porous solid formed by replacement of liquid in a gel with a gas so that the resulting solid is the same size as the original. In general, aerogels are characterized by having high strength, specifically compressive strength, low density, low optical index of refraction, low thermal conductivity, high surface area, and low dielectric constant.

The aerogel matrix 202 in the CNF aerogel 200 of FIG. 2 includes crosslinked CNFs 204. As is understood from the definition of an aerogel in the preceding paragraph, the CNF aerogel 200 also includes a plurality of pores 206 provided between the crosslinked CNFs 204, where the amount of pores 206 in the CNF aerogel 200 defines a porosity of the CNF aerogel 200 material.

Cellulose nanofibers (CNFs) may be defined as a biomass material which is typically derived from wood-derived fiber (or pulp) that has been micro-refined to the nano level. Cellulose nanofibers may have a diameter of less than 100 nm and may be separated from pure cellulose using mechanical approaches. According to differences in separation methods, cellulose can be divided into two categories: (i) cellulose nanocrystals (CNC) or cellulose whiskers, and (ii) cellulose nanofibers (CNF), which are also known as nanofibrillar cellulose (NFC) or microfibrillated cellulose (MFC).

The micro-defining process may also be referred to as "nanofibrillation, miniaturization, or fibrillation," where a bundle of wood fibers is refined to a structure having a size on a nanometer to micrometer scale. In general, CNFs are light and strong, have high gas barrier properties and low thermal expansion. Cellulose nanofibers (CNFs), inherit the traits of natural cellulose, such as low density, biodegradability, reproducibility, and have outstanding characteristics such as high surface area-to-volume ratio, excellent tolerable mechanical properties, high gas barrier property, low coefficient of thermal expansion, large specific surface area, high stiffness, high strength, low weight, high biocompatibility, and easy film-forming capability.

Nanofibers can be defined as nano-sized cellulose fibers<100 nm wide or micron-sized fibers with nano-dimensional cross-sectional structures. The CNFs of one or more embodiments have at least one dimension smaller than 100 nm. For example, the length and/or the diameter of the CNF may be less than 100 nm in order to be defined as a "nanofiber."

As described herein, crosslinking refers to a chemical reaction occurring between polymer chains which links individual polymer chains together. It is noted herein that cellulose is a polymeric material, and therefore the process of crosslinking may be applied to the CNFs of one or more embodiments to produce a crosslinked CNF structure, as will be described in more detail in the following sections.

The CNF aerogel of one or more embodiments may have a porosity in a range of from about 84% to about 99%. For example, the CNF aerogel may have a porosity in a range having a lower limit selected from about 84, 90, and 95% to an upper limit selected from about 97, 98, and 99%, where any lower limit may be paired with any upper limit.

Returning to FIG. 2, the CNF aerogel 200 further includes a plurality of cellulose nanocrystal acetone (a-CNC) suspension particles 208 dispersed throughout the CNF aerogel 200. The a-CNC suspension particles 208 are impregnated into the monolithic structure of the aerogel matrix 202 to form the CNF aerogel 200 during the method for preparing a CNF aerogel 200, which will be described in the following section.

The a-CNC suspension particles of one or more embodiments are highly crystalline, high aspect ratio, nanoparticles composed of linear homopolymers of β (1-4) linked D-glucose units. The a-CNC suspension particles exhibit useful mechanical properties, such as high strength and dimensional anisotropy, as well as tunable surface chemistries. The shape of the a-CNC suspension particles may be rigid, rod-shaped particles, which are generally extracted from sources such as wood pulp or cotton through an acid hydrolysis process. In some embodiments, acids and oxidizing agents may be used to produce CNCs with varying surface chemistries (e.g., carboxyl groups, phosphate half-esters, and uncharged).

The a-CNC suspension particles of one or more embodiments have a length in a range of about 100 nm to 200 nm. For example, the a-CNC suspension particles may have a length in a range having a lower limit selected from about 100, 125, and 150 nm to an upper limit selected from about 175, and 200 nm, where any lower limit may be paired with any upper limit.

The a-CNC suspension particles of one or more embodiments have a diameter in a range of about 5 nm to 20 nm. For example, the a-CNC suspension particles may have a cross-section in a range having a lower limit selected from about 5, 7.5, and 10 nm to an upper limit selected from about 12.5, 15, and 20 nm, where any lower limit may be paired with any upper limit.

According to embodiments of the present disclosure, the effectiveness of CNF aerogel in capturing $CO_2$ may be optimized by optimizing one or more properties of the CNF aerogel selected from degree of substitution (DS), porosity, morphology, surface area, and compressional strength.

Degree of substitution (DS) refers herein to the average number of substituent groups attached per base unit in a polymer. The CNF aerogel of one or more embodiments may have a degree of substitution in a range of from 1 to 3. In one or more embodiments, the CNF aerogel may include a cellulose ester ((C1-C10)alkyl-C(O)-functionalized cellulose) with a degree of substitution ranging from 1 to 3.

The CNF aerogel of one or more embodiments may have a bulk density in a range of from about 1 mg/mL to about 500 mg/mL. For example, the CNF aerogel may have a bulk density in a range having a lower limit selected from 1, 5, 10, 25, and 50 $mg/cm^3$ to an upper limit selected from 100, 250, and 500 $mg/cm^3$ where any lower limit may be paired with any upper limit.

The CNF aerogel of one or more embodiments may have a surface area in a range of from about 100 $m^2/g$ to about 1000 $m^2/g$. For example, the CNF aerogel may have a surface area in a range having a lower limit selected from 100, 200, 300, and 400 $m^2/g$ to an upper limit selected from 500, 750, and 1000 $m^2/g$, where any lower limit may be paired with any upper limit.

Compression strength is defined herein as the ability for a material or structure to withstand loads which tend to reduce its size. The CNF aerogel of one or more embodiments may have a compression strength in a range of from about 5000 kPa to about 17,000 kPa. For example, the CNF aerogel may have a compression strength in a range having a lower limit selected from 5000, 7500, 10,000 kPa to an upper limit of selected from 12,500, 15,000, and 17,000 kPa, where any lower limit may be paired with any upper limit.

The CNF aerogel of one or more embodiments may have a $CO_2$ adsoption capacity in a range of from about 1 mmol/g to about 12 mmol/g. For example, the CNF aerogel may have a $CO_2$ adsoption capacity in a range having a lower limit selected from 1, 2.5, and 5 mmol/g to an upper limit selected from 7.5, 10, and 12 mmol/g, where any lower limit may be paired with any upper limit.

Method for Preparing Cellulose Nanofiber (CNF) Aerogel

Embodiments disclosed herein also relate to methods for preparing CNF aerogels, which may be used in the systems and methods described herein for $CO_2$ capture. A CNF aerogel is a porous solid material that may generally be prepared in three steps: dissolving/dispersing cellulose or cellulose derivatives, forming CNF hydrogel by the sol-gel process, and drying CNF hydrogel while basically retaining its 3D porous structure.

Figure 3:
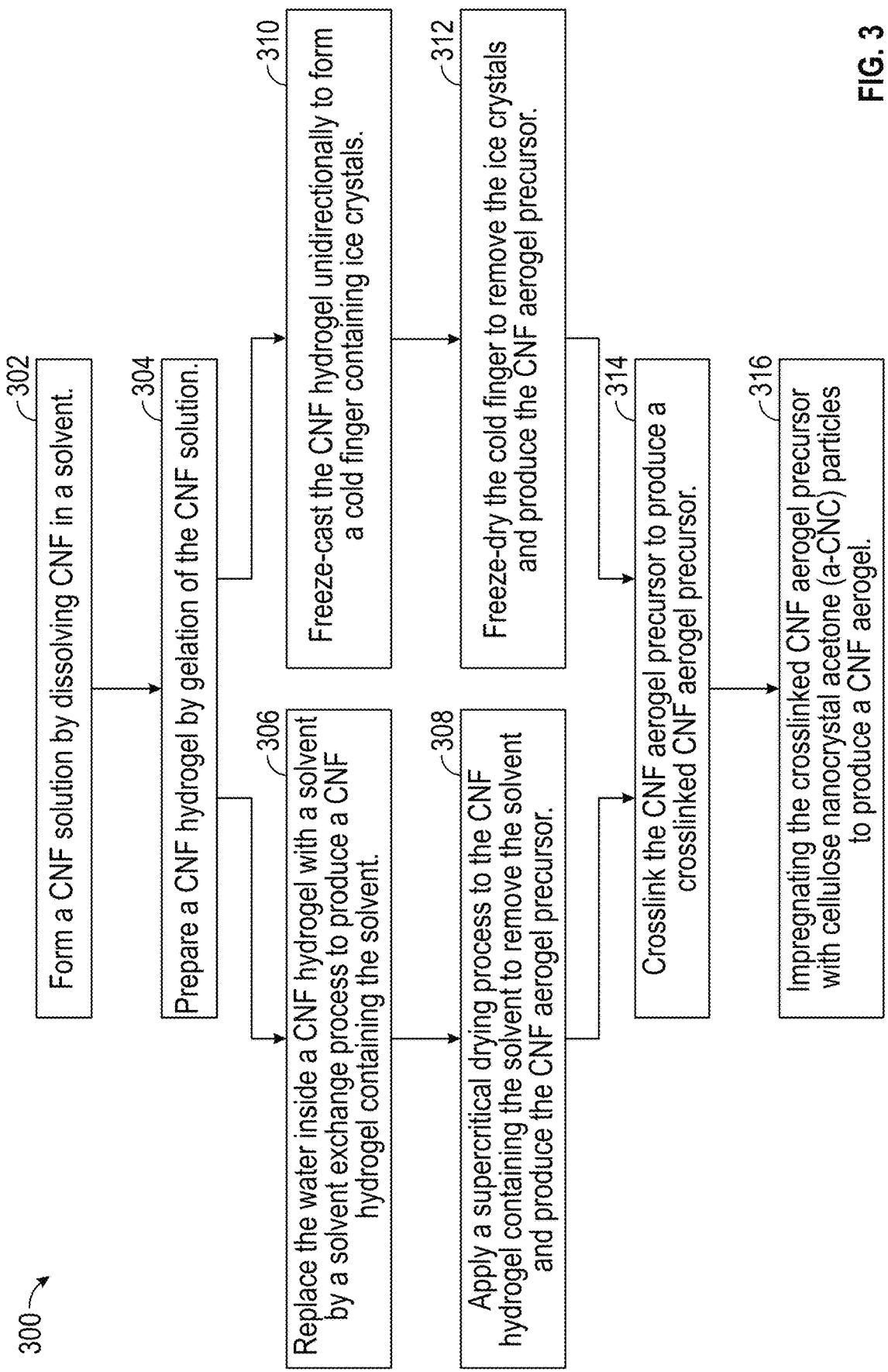
FIG. 3 is a flowchart for a method according to one or more embodiments.

Methods for preparing a CNF aerogel are summarized in the flowchart of FIG. 3. The method 300 includes, generally, dissolving and/or dispersing cellulose or cellulose derivatives in solution, gelation (e.g., forming CNF hydrogel by the sol-gel process), drying the CNF hydrogel while maintaining a 3D porous structure to form an aerogel, and impregnating the aerogel. Different sub-steps may be used when applying different drying methods. For example, when using a supercritical drying step, the method may further include treating the hydrogel with a solvent exchange, prior to supercritical drying. When using a freeze-drying step, the method may further include freeze-casting prior to freeze-drying.

The drying process used to produce the CNF aerogel precursor of one or more embodiments may determine the morphology of cellulose within the CNF aerogel. Thus, the morphology of cellulose aerogels depends on the method of drying. For example, when conventional drying methods are used, the capillary pressure induced by the bending of the air-liquid interface can cause the gel pore structure to collapse and crack. According to embodiments of the present disclosure, supercritical drying (e.g., using alcohol, acetone, or $CO_2$) and/or vacuum freeze-drying may be used to prepare cellulose aerogels. Freeze-drying is a sublimation of the solid, usually frozen water, from the pores of a wet precursor. When drying under supercritical conditions, the liquid/gas surface tension is zero, because there is no longer liquid/gas meniscus. Aerogels prepared by drying with supercritical $CO_2$ usually present a cauliflower-like arrangement of cellulose: an agglomeration of small shaggy, beads. However, other freeze-drying techniques may be used to create a sheet-like cellulose network with large and interconnected pores that are several micrometers in diameter due to ice growth during water freezing.

In step 302 of the method 300, a CNF solution may be formed, for example, by dissolving and/or dispersing cellulose or cellulose derivatives, such as CNFs, in a first solvent system. In one or more embodiments, the first solvent system may eliminate hydrogen bond networks and hydrophobic interactions. In some embodiments, the forming a CNF solution includes chemical modification of cellulose to create a hydrogel derivate. The first solvent system according to one or more embodiments may be any solvent suitable for dissolving cellulose or cellulose derivatives (such as CNFs) to produce the hydrogel derivate.

The first solvent system used to dissolve CNFs according to one or more embodiments may be a basic solution, such as an alkali (NaOH or LiOH) solution system (alkali/water, alkali/water/urea or thiourea, and polyethylene glycol (PEG), LiCl/DMSO, LiCl/dimethylacetamide (DMAc), and ionic liquids (ILs). The concentration of the first solvent system may be about 0.1 wt % to about 70 wt % of the CNF-first solvent system solution. For example, the concentration of the first solvent system may be in a range having a lower limit selected from 0.1 wt %, 5 wt %, and 15 wt % to an upper limit selected from 25 wt %, 50 wt %, and 70 wt %, where any lower limit may be paired with any upper limit.

After dissolving in the first solvent system, a CNF hydrogel may be prepared, in step 304, by gelation of the CNF solution. For cellulose components, gelation can be initiated by both chemical (e.g., the use of a crosslinking agent) and physical factors (e.g., changes in temperature or pH of the medium). In some embodiments, the gelation step 304 may include mixing the CNF solution with an acid crosslinker and stirring for one hour at room temperature to form a CNF hydrogel. In one or more embodiments, the acid crosslinker is 1,2,3,4-butanentetracarboxylic acid (BTCA).

In one or more embodiments, preparing a CNF hydrogel further includes adding toluene-2,4-diisocyanate and a pyridine catalyst to the homogenous CNF solution to crosslink with cellulose acetate. The concentration of cellulose acetate may be controlled to form the CNF hydrogels. Upon crosslinking the cellulose acetate in the homogeneous solution, a CNF hydrogel is obtained.

In some embodiments, a CNF hydrogel may be prepared by mechanical or ultrasonic treatment of chemically modified cellulose to form a cellulose dispersion, which may then be converted to a hydrogel and then subjected to a drying method.

In some embodiments, a CNF hydrogel may be prepared by converting a cellulose dissolution (providing cellulosic derivative(s)) into hydrogel by a cellulose regeneration method. For example, cellulose dissolved into a solution may be regenerated by immersing the cellulose in an anti-solvent coagulation agent to provide regenerated cellulose in the form of a hydrogel. In one or more embodiments, a CNF hydrogel may be formed using a sol-gel process including agglomerating polymers in the solution or a phase separation process when coagulative regeneration is used. The exchange of solvent with non-solvent (regeneration) may lead to desolvation of the cellulose molecules and to the supposed reformation of the intramolecular and intermolecular hydrogen bonds.

The concentration of CNF in the CNF hydrogel may be in a range of from about 0.1 wt % to about 10 wt % of the CNF hydrogel. For example, the concentration of CNF in the CNF suspension may be in a range having a lower limit of from about 0.1, 0.5, 1, and 2.5 wt % to an upper limit of about 5, 7.5, and 10 wt %, where any lower limit may be paired with any upper limit.

After preparation of the CNF hydrogel in step 304, the CNF hydrogel may be subjected to one or more drying steps. For example, the CNF hydrogel may be dried using supercritical drying or freeze-drying. Upon drying the CNF hydrogel, a CNF aerogel precursor is produced.

In one or more embodiments, methods of forming a CNF aerogel include using a supercritical drying step 308. In such embodiments, when the CNF hydrogel is prepared using a first solvent system that contains water as at least one of the components of the first solvent system, the CNF hydrogel may undergo a solvent exchange step 306. The solvent exchange step 306 may be used to remove any residual water from the CNF hydrogel because water may be immiscible with a supercritical fluid used for supercritical drying (e.g., carbon dioxide). Thus, the residual water inside the CNF hydrogel may be replaced with a solvent that forms a homogeneous system with the supercritical fluid.

In one or more embodiments, a solvent exchange step 306 may include exchanging residual water in a CNF hydrogel for a second solvent. In some embodiments, the second solvent may be an organic solvent, such as methanol, ethanol, 2-propanol, and acetone. The solvent exchange step 306 using the second solvent may be carried out in a stepwise manner since organic solvents and water have different surface tensions, and pore collapse may occur from concentration gradients. This collapse may lead to the destruction of the CNF hydrogel structure and shrinkage of material. Thus, according to embodiments of the present disclosure, CNF hydrogel samples may be transferred from multiple solutions of pure water, solutions of water and the second solvent (e.g., an organic solvent), and pure second solvent in a stepwise manner with a sequential increase in the concentration of the second solvent at each step. At the final steps of the solvent exchange, the CNF hydrogels may be placed several times in a pure second solvent (e.g., a pure organic solvent). In total, a significant time from tens of hours to several days may be spent on the solvent exchange. After completion, the CNF hydrogels containing the second solvent may be placed in a high-pressure apparatus, and a supercritical drying process may be carried out to dry the CNF hydrogel.

In a supercritical drying step 308, after the CNF hydrogel has undergone solvent exchange, the CNF hydrogel may be placed in a chamber where it is exposed to a supercritical fluid in a state where temperature and pressure surpass the second solvent's critical point, displaying properties of both liquid and gas. During supercritical drying, the supercritical fluid may penetrate the CNF hydrogel's pores, replacing the second solvent. Then, by altering the pressure and temperature, the supercritical fluid is removed, leaving the material dry (i.e., no remaining second solvent) and thereby forming an aerogel. Upon applying the supercritical drying process to the CNF hydrogel containing the second solvent to remove the solvent, a CNF aerogel precursor is produced.

Another method to produce a CNF aerogel precursor according to one or more embodiments includes freeze-drying. In methods using a freeze-drying step, a CNF hydrogel may be frozen unidirectionally by a freeze-casting step 310 to form a cold finger containing ice crystals. For example, a freeze-casting step 310 may include freezing the CNF hydrogel at a freezing rate of 5 K/min. Freeze-casting refers to a technique that is used to exploit the highly anisotropic solidification behavior of solvent in well dispersed slurry mixture. During the freeze-casting step 310, a CNF hydrogel untreated by a solvent exchange step (where water from the first solvent used to form the hydrogel remains) may be cooled to induce freezing of the water in the hydrogel. During freezing, ice crystals form and grow, causing the other components of the hydrogel to segregate around these ice crystals in a freeze direction. Subsequently, the cold finger may be subjected to freeze-drying step 312 to remove the ice, leaving behind a porous aerogel structure with a specific architecture dictated by the ice crystal template. Thus, freeze-casting may include subjecting the CNF hydrogel to a gradient temperature during the freezing process to directionally grow crystallites into an anisotropic aerogel structure.

In step 312, a freeze-drying step may include freeze-drying the freeze-casted hydrogel for a duration of time (e.g., 50-80 hours) under a pressure less than atmosphere (under vacuum conditions). Freeze-drying refers to a technique for sublimation of the solid formed during freeze-casting, e.g., ice crystals, from the pores of a wet precursor. Thus, freeze-casting may be used to create porous materials with controlled structures by freezing and manipulating the arrangement of materials in the CNF hydrogel, while freeze-drying is a sublimation process used to remove moisture from substances while maintaining their integrity by sublimating frozen water. For example, in one or more embodiments, freeze-drying may include freezing for a duration of about 72 hours at a pressure of 0.064 mbar using a freeze dryer. Upon drying, a CNF aerogel precursor is formed.

In one or more embodiments, after drying and forming a CNF aerogel precursor, the CNF aerogel precursor may undergo a crosslinking step 314, where the cellulose aerogel is placed in a heated vacuum chamber to crosslink the cellulose aerogel. In some embodiments, a crosslinking step 314 may include placing a CNF aerogel in a vacuum oven at 393 K for 3 hours to crosslink the aerogel via esterification between CNFs and the crosslinker used to form the CNF hydrogel in step 304 (e.g., BTCA). Upon crosslinking the CNF aerogel precursor, a crosslinked CNF aerogel precursor is produced.

After crosslinking (step 314), the cellulose aerogel may undergo an impregnation step 316, where the cellulose aerogel is impregnated with cellulose nanocrystal acetone (a-CNC) particles. The a-CNC particles may those described in sections, above.

Figure 4:
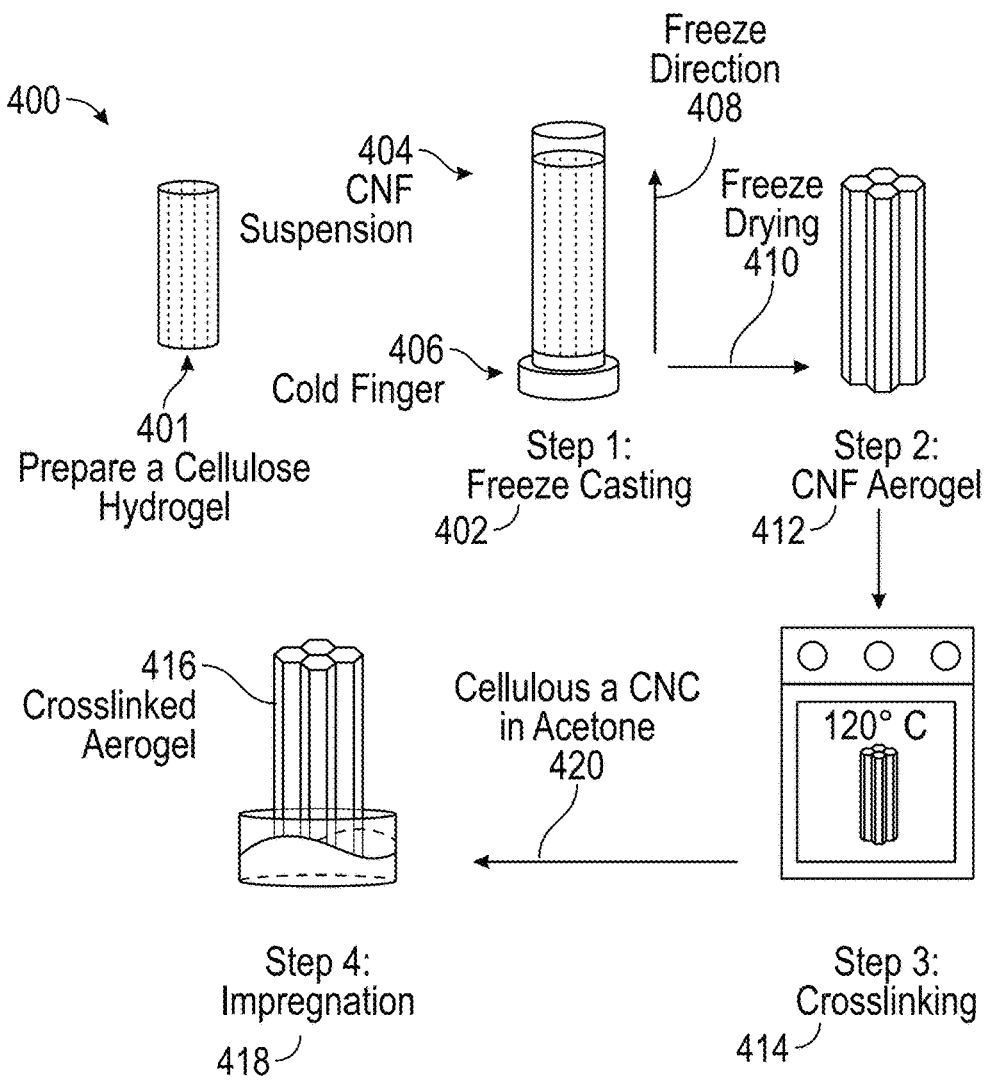
FIG. 4 is an illustration of a method for producing a CNF aerogel according to one or more embodiments.

An example of a method 400 for preparing a CNF aerogel of one or more embodiments is illustrated in FIG. 4. The method 400 of FIG. 4 is a visual representation of preparing a CNF aerogel using freeze-casting and freeze-drying (as described in steps 310 and 312, above).

In FIG. 4, the method 400 for preparing a CNF aerogel includes preparing a CNF hydrogel in step 401. The CNF hydrogel may be prepared by any method known in the art including methods described in steps 302 and 304 of FIG. 3, above.

Upon preparing the CNF hydrogel in step 401, the method 400 for preparing a CNF aerogel further includes freeze-casting 402 cellulose nanofibers from the CNF hydrogel 404. In the method shown in FIG. 4, the CNF hydrogel 404 is freeze-cast 402 in a cold finger 406 in a freeze direction 408.

Upon freeze-casting 402, the cold finger 406 is subjected to freeze-drying 410 to produce a CNF aerogel precursor 412. In one or more embodiments, freeze-drying 410 of the cold finger 406 is carried out in a vacuum.

After freeze-drying 410, the formed CNF aerogel precursor 412 is a porous solid material. According to methods of the present disclosure, the CNF aerogel precursor 412 may be placed in a convection oven and crosslinked 414 with an acid under heat to produce a crosslinked CNF aerogel precursor 416 having a monolithic structure. The crosslinked CNF aerogel precursor 416 is then impregnated 418 with cellulose nanocrystal acetone (a-CNC) suspension particles 420. Upon impregnating 418 the crosslinked CNF aerogel precursor 416 with a-CNC suspension particles 420, a CNF aerogel is produced (as shown in FIG. 2).

In one or more embodiments, crosslinking the CNF aerogel precursor under heat may occur at a temperature in a range of from about 25° C. to about 100° C. For example, crosslinking the CNF aerogel precursor under heat may occur at a temperature in a range having a lower limit selected from 25° C. and 50° C. to an upper limit selected from 75° C. and 100° C.

In one or more embodiments, crosslinking the CNF aerogel precursor under heat may occur for a duration of between 10 minutes to 12 hours. For example, crosslinking the CNF aerogel precursor under heat may occur for a duration in a range having a lower limit selected from 10 min, 30 min, 1 hour, and 2 hours to an upper limit selected from 5 hours, 10 hours, and 12 hours.

The a-CNC suspension particles used in the method of one or more embodiments may be the a-CNC suspension particles described in previous sections.

In one or more embodiments, in the impregnation process of the CNF aerogel, acetate functional groups were used and preferred over polymers with only ether groups. Literature shows that acetate-functionalized polymers are more $CO_2$-soluble than polymers with only ether groups because the addition of an ester oxygen provides a much stronger attractive site than that of the ether group for $CO_2$ interactions.

Figure 5:
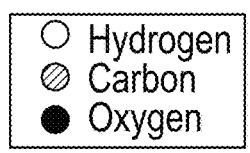
FIG. 5 shows bonding mechanisms in accordance with one or more embodiments.
Figure 5:
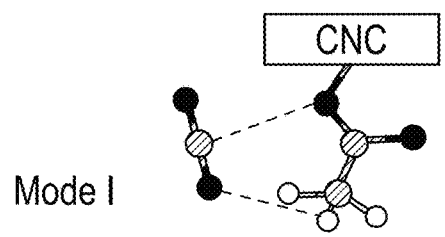
Figure 5:
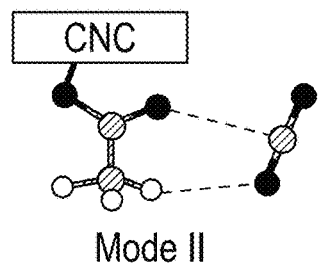
Figure 5:
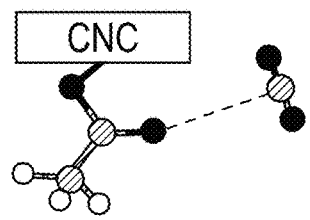

The reason behind the high $CO_2$ solubility in acetate is due to their three binding modes that can interact with $CO_2$ and induce solubility. These three interaction sites include two with a carbonyl oxygen and one with an ester oxygen as depicted in FIG. 5. Due to this reason, the cellulose nanocrystals' acetone suspension particles (a-CNC) were utilized in impregnating the CNF rather than acetates.

Method for $CO_2$ Sequestration

Embodiments disclosed herein also relate to a method for $CO_2$ sequestration. The CNF aerogel of one or more embodiments may adsorb $CO_2$ by the following mechanism. Hydroxyl groups on cellulose surface allow silane modification to promote chemisorption of $CO_2$. The modified CNF aerogel of one or more embodiments has a high BET surface area. Adsorption in the presence of water involves the formation of a zwitterion due to the interaction between $CO_2$ and primary amine group followed by deprotonation by water or primary amine group to produce a carbamate. Regarding the $CO_2$ adsorption in amine solution, $CO_2$ reacts with primary and secondary amines to form carbamic acid, carbamate, and bicarbonate types. Based on these reactions, $CO_2$ reacts with the surface groups of an unmodified or phthalimide-modified CNF. The mechanism between $CO_2$ amino and carboxyl groups are detailed in Equations 1-3 below:

$$CO_2 + OH^- \rightarrow HCO_3^- \quad \text{(Equation 1)}$$

$$CO_2 + RNH_2 \rightarrow RNH_2 + COO^- \quad \text{(Equation 2)}$$

$$RNH_2 + COO^- + RNH_2 \rightarrow RNHCOO^- + RNH_3^+ \quad \text{(Equation 3)}$$

Figure 6:
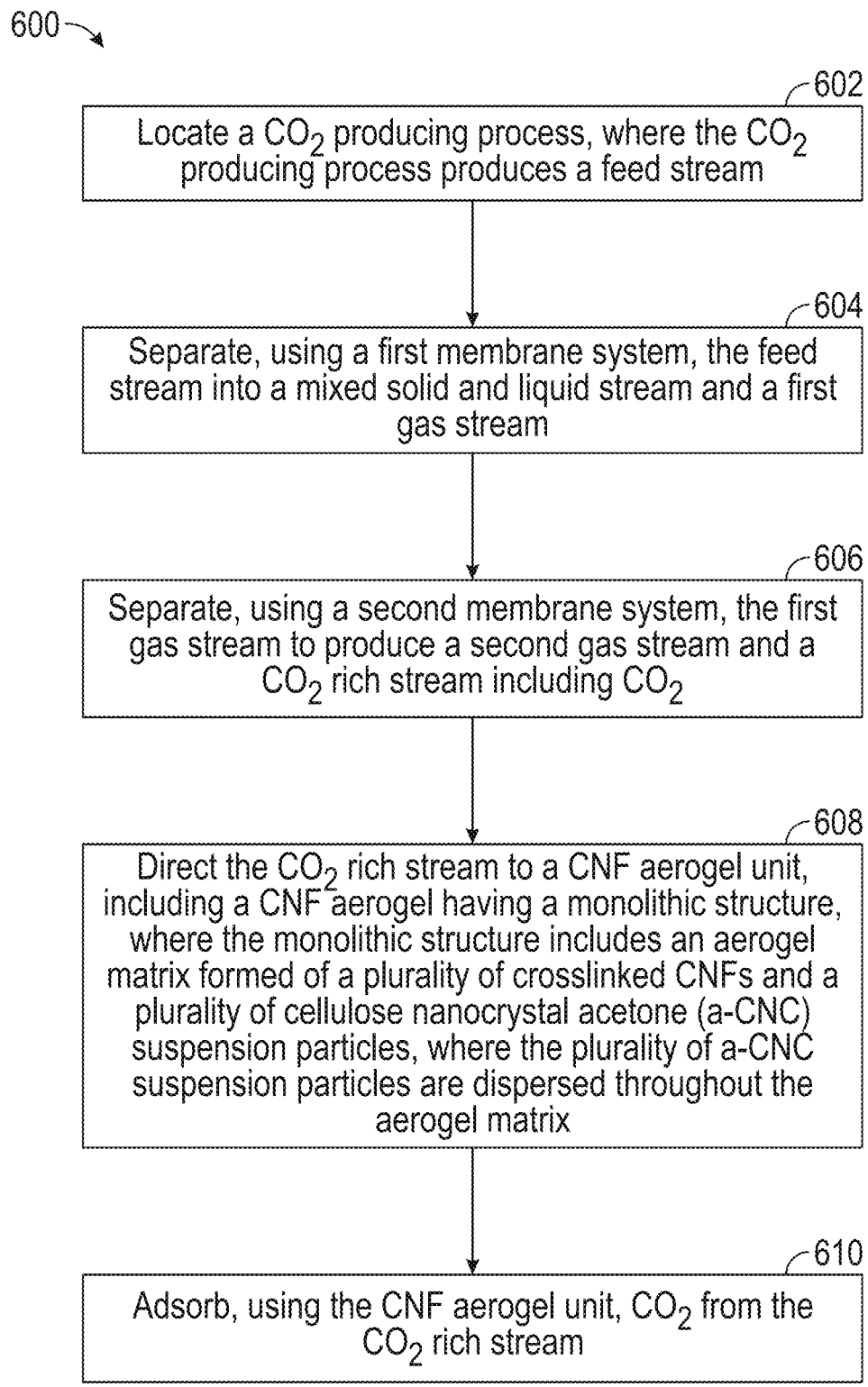
FIG. 6 is a flowchart for a method according to one or more embodiments.

The method for $CO_2$ sequestration of one or more embodiments is shown in the flowchart of FIG. 6. The method 600 includes, in step 602, locating a $CO_2$ producing process, where the $CO_2$ producing process produces a feed stream. In some embodiments, the $CO_2$ producing process is a hydraulic fracturing process, and the hydraulic fracturing process produces a feed stream by a $CO_2$-foam based fracturing treatment.

The method 600 of FIG. 6 also includes, in step 604, separating, using a first membrane system, the feed stream into a mixed solid and liquid stream and a first gas stream.

The method 600 of FIG. 6 further includes, in step 606, separating, using a second membrane system, the first gas stream to produce a second gas stream and a $CO_2$ rich stream including $CO_2$.

The method 600 of FIG. 6 also includes, in step 608, directing the $CO_2$ rich stream to a CNF aerogel unit, including a CNF aerogel having a monolithic structure, where the monolithic structure includes an aerogel matrix, a plurality of crosslinked CNFs, and a plurality of cellulose nanocrystal acetone (a-CNC) suspension particles. The crosslinked CNFs and the plurality of a-CNC suspension particles are dispersed throughout the aerogel matrix.

The method 600 of FIG. 6 includes, in step 610, adsorbing, using the CNF aerogel unit, $CO_2$ from the $CO_2$ rich stream. In some embodiments, the method 600 further includes determining, by calculating a reduced adsorption capacity, when the CNF aerogel is saturated with $CO_2$ and replacing the CNF aerogel unit. The reduced adsorption capacity may be calculated using Equation 4, below.

$$\text{Adsorption capacity} = [(C_o - C_e)/m] \times V \quad \text{(Equation 4)}$$

Where adsorption capacity has units of mg/g, $C_o$ is an initial concentration of adsorbate in ppm, $C_e$ is an equilibrium concentration of adsorbate, m is a mass of the adsorbent, and V is a volume of solution containing the adsorbate injected into the CNF aerogel unit.

Embodiments of the present disclosure may provide at least one of the following advantages.

Cellulose and its derivatives can enhance the mechanical properties and moisture affinity of aerogel materials. In addition, the following advantages can be obtained by using cellulose as the precursor for the preparation of aerogels. The reserve of cellulose raw material is inexhaustible and renewable. Additionally, because cellulose chains are rich in hydroxyl groups, no cross-linking agent may be needed in the aerogel preparation process. For example, a stable three-dimensional (3D) network structure can be obtained by intramolecular and intermolecular physical cross-linking of hydrogen bonds, thus making the aerogel preparation process simple.

A CNF aerogel according to one or more embodiments disclosed herein may exhibit higher $CO_2$ adsorption capacity, lower cost, simplified design, low emissions, non-hazardous ingredients, and environmental sustainability, when compared to previous solutions. The CNF aerogel of one or more embodiments is ultralight, flexible, extremely strong, water repellent, and has high surface area and excellent thermal conductivity. The CNF aerogel material may also be less energy intensive than other methods used to capture $CO_2$. In contrast to CNF aerogels for $CO_2$ capture according to one or more embodiments described herein, prior solutions and methods to capture $CO_2$ may include flaring carbon dioxide gas in flow back operations, not utilizing an environmentally friendly material for carbon dioxide storage, utilizing hazardous materials that are not biodegradable and not readily available in nature.

Upon saturation with $CO_2$, a saturated CNF aerogel unit may be recycled and converted into value-added products such as recycled fabrics. Recycled fabrics are fabrics which have been made from waste material, where the waste material has been reprocessed into new fibers for weaving a new fabric to replace traditional synthetic fabrics such as clothes, bags, and baby textile. In some embodiments, saturated CNF aerogel units can be utilized to fabricate aerogel used as oil absorbent and cargo carriers on water. In some embodiments, saturated CNF aerogel units may be used as structural materials and strength additives, for example, lightweight composites in aerospace and automotive. The applications of CNFs may include sensors, food packaging, electrode, and microbatteries. Therefore, the CNF aerogel unit of one or more embodiments is a sustainable way to capture and store $CO_2$ and may advantageously be recycled and reused in other applications once a CNF aerogel unit is saturated with $CO_2$ and needs to be replaced.

EXAMPLES

The CNF aerogel of one or more embodiments may be characterized by the following properties, which may influence the ability of the proposed CNF aerogel material's $CO_2$ sequestration. Properties of interest for the CNF aerogel include, but are not limited to, degree of substitution (DS), porosity, morphology, surface area, and compressional strength.

Degree of substitution (DS) of the a-CNCs was determined by dispersing 0.1 g of dried a-CNCs in 40 mL of 70 vol % ethanol at 60° C. for 30 min. Then, 40 mL of 0.1 M NaOH was added, and the mixture was stirred for 15 min. Then, the solution stood at room temperature for 48 h with occasional shaking. Phenolphthalein was used as a pH indicator, and 0.5 N HCl was used to titrate the mixture until the color changed from pink to faint pink. The unacetylated CNC was titrated as a blank using the same method, and Equations 5 and 6 below were used to calculate the degree of substitution (DS) of the a-CNCs:

$$DS = \frac{162 \times Acyl\ \%}{4300 - (42 \times Acyl\ \%)} \quad \text{(Equation 5)}$$

$$Acyl\ \% = \frac{(V_b - V_s) \times N_{HCl} \times 43}{W \times 1000} \times 100\% \quad \text{(Equation 6)}$$

Where Acyl % denotes the acyl group content. $V_b$ and $V_s$ represent the volumes of HCl added to the blank and to the a-CNC sample, respectively. $N_{HCl}$ corresponds to the normality of the HCl solution, and W is the sample mass.

In general, porosity is a measurement of void spaces within a material. The porosity of the prepared CNF aerogels of one or more embodiments was calculated using the following equation:

$$P = 1 - \frac{\rho^*}{\rho} \quad \text{(Equation 7)}$$

where the density of the aerogel, $\rho^*$, was calculated by dividing the weight of the aerogel by its volume. While the density of the solid material, $\rho$, was calculated using the following equation:

$$P = \frac{1}{\left(\frac{w_c}{\rho_c} + \frac{w_a}{\rho_A} + \frac{w_B}{\rho_B}\right)} \quad \text{(Equation 8)}$$

where $w_c$, $w_A$ and $w_B$ denote the weight percentages of CNFs, the impregnated material (cellulose acetate or a-CNCs), and BTCA, respectively. $P_c$, $\rho_A$ and $\rho_B$ correspond to the solid densities of cellulose, the impregnated material, and BTCA respectively, which are 1.46 g/cm³, 1.28 g/cm³, and 1.65 g/cm³.

The morphology of CNF aerogels was investigated using a scanning electron microscope (JSM-IT300 InTouchScope). Samples were cut by a sharp blade that was perpendicular and parallel to the freezing direction, respectively. The cut surfaces were coated with gold using a Leica EM ACE200 coater prior to the observation to avoid charging, and the secondary electron images were captured.

The mechanical properties of CNF aerogels were examined by compression testing using a Q800 dynamic mechanical analyzer with the compression configuration. Samples were cut into a 1-cm cubic geometry and tested in both axial and radial directions. The experiment was carried out when equilibrated at 303 K with a 0.01 N preload and a strain rate of 10%/min. The elastic modulus I of the sample was calculated according to the slope of tIe initial linear part of the stress-strain curve, and the specific elastic modulus (Es) of the samples was calculated as shown in Equation 5, below:

$$E_s = \frac{E}{\rho^*} \qquad \text{(Equation 9)}$$

In this invention, the $CO_2$ adsorption capacity of the impregnated CNF aerogel was identified as a function of pressure using a BET analyzer. Approximately 20 mg of the sample was loaded and degassed at 393 K for 24 h, and the degassed sample was precisely weighed and transferred back to the analyzer. The $CO_2$ isotherm was then measured at 273 K in a pressure range of 0-101 kPa. The $CO_2$ forward-step change breakthrough curve of the aerogels was determined by loading the sample in a steel column (15 mm in inner diameter, 300 mm in length). The sample was first treated under a 0.5 L/min nitrogen flow at 368 K for 24 h. After cooling, a mixture of $N_2/CO_2$ with 10% $CO_2$ was fed at a flow rate of 0.3 L/min at room temperature. The $CO_2$ concentration was monitored by an IR 1507 fast-response $CO_2$ infrared transducer.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for carbon dioxide ($CO_2$) sequestration, comprising:
    locating a $CO_2$ producing process, wherein the $CO_2$ producing process produces a feed stream;
    separating, using a first membrane system, the feed stream into a mixed solid and liquid stream and a first gas stream;
    separating, using a second membrane system, the first gas stream to produce a second gas stream and a $CO_2$ rich stream comprising $CO_2$;
    directing the $CO_2$ rich stream to a cellulose nanofiber (CNF) aerogel unit, comprising,
        a CNF aerogel, comprising a monolithic structure, wherein the monolithic structure comprises;
            an aerogel matrix,
            a plurality of crosslinked CNFs, and
            a plurality of cellulose nanocrystal acetone (a-CNC) suspension particles,
                wherein the plurality of crosslinked CNFs and the plurality of a-CNC suspension particles are dispersed throughout the aerogel matrix; and
        adsorbing, using the CNF aerogel unit, the $CO_2$ from the $CO_2$ rich stream.

2. The method of claim 1, wherein the $CO_2$ producing process comprises a hydraulic fracturing process, and wherein the hydraulic fracturing process produces the feed stream by fracturing treatment employing a $CO_2$ foam.

3. The method of claim 1 further comprising determining, by calculating a reduced adsorption capacity, when the CNF aerogel unit is saturated with the $CO_2$:

$$\text{Adsorption capacity} = [(C_o - C_e)/m] \times V \qquad \text{(Equation 4)}$$

wherein adsorption capacity has units of mg/g, Co is an initial concentration of adsorbate in ppm, Ce is an equilibrium concentration of adsorbate, m is a mass of the adsorbent, and V is a volume of solution containing adsorbate injected into the CNF aerogel unit.

4. The method of claim 3, further comprising replacing the CNF aerogel unit when it is saturated with $CO_2$.

* * * * *